United States Patent [19]

Rasmussen

[11] 4,432,559
[45] Feb. 21, 1984

[54] HYDRAULIC CHUCK HAVING RING COLLET

[76] Inventor: Robert Rasmussen, 3800 - 56th Ave. N., Minneapolis, Minn. 55429

[21] Appl. No.: 331,324

[22] Filed: Dec. 16, 1981

[51] Int. Cl.³ .................... B23B 31/30; B65D 45/32; F16L 21/06
[52] U.S. Cl. ..................................... 279/4; 285/323; 220/319
[58] Field of Search ............. 279/4; 138/89; 285/323, 285/322, 18; 220/319

[56] References Cited

U.S. PATENT DOCUMENTS

| | | | |
|---|---|---|---|
| 2,690,939 | 10/1954 | Whaley | 220/319 |
| 3,689,087 | 9/1972 | Flett | 279/4 |
| 3,690,687 | 9/1972 | Moe | 279/4 |
| 3,743,326 | 7/1973 | Courtot et al. | 285/323 |
| 4,094,521 | 6/1978 | Piotrowski | 279/4 |
| 4,125,043 | 11/1978 | Leutgab | 279/4 |
| 4,142,739 | 3/1979 | Billingsley | 285/323 |
| 4,319,516 | 3/1982 | Rohm | 279/4 |
| 4,335,908 | 6/1982 | Burge | 285/323 |
| 4,347,753 | 9/1982 | Claussen | 279/4 |

Primary Examiner—E. R. Kazenske
Assistant Examiner—Paul M. Heyrana, Sr.
Attorney, Agent, or Firm—John S. Munday

[57] ABSTRACT

A hydraulic chuck for engagement of the outside of tubes. A set of ring collets are provided to grip the tube and hold it while the tube is tested, expanded, or otherwise worked on. Seals are provided to prevent fluid flow between the tube and the chuck. A piston is actuated to engage and release the ring collets, and to engage the seal when the collets are engaged.

7 Claims, 1 Drawing Figure

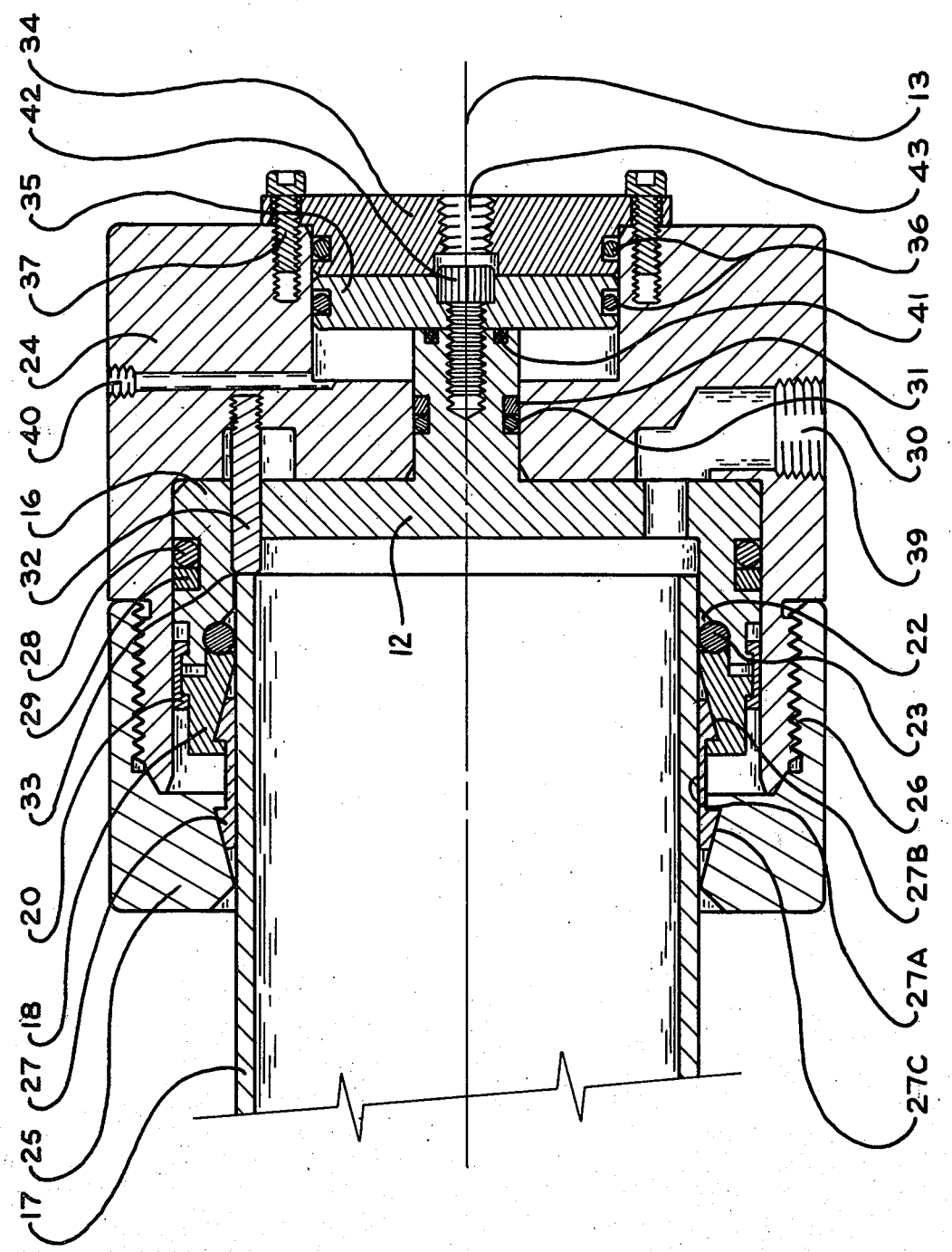

HYDRAULIC CHUCK HAVING RING COLLET

BACKGROUND OF THE INVENTION

Fluid pressure operated devices for radially expanding portions of tubing are known, such devices being disclosed in U.S. Pat. Nos. 1,448,457; 2,479,702; 2,938,562; and 3,200,627. Structures of these patents include fluid conveying mandrels receivable within the tubes, means for expanding the mandrels to hold the tubing, and die elements against which portions of the tubes are flared or otherwise formed by fluid pressure. These expanding devices are customarily used to provide shapped bulges in tubing for coupling purposes and the like. In addition, they are used to expand tubing to fit fins and other apparatus connected to the outer surface of the tubing.

Several hydraulic chucks have been developed which are suitable for tightly gripping one end of the elongated tube while simultaneously delivering a tube expanding fluid. Among these U.S. Pat. Nos. 3,505,846; 3,813,751; 3,962,769; and 4,189,162.

One of the problems which continuously has plagued those users of hydraulic chucks is the inability of such chucks to accomodate relatively large diameter tubes such as those having diameters of from about 2 inches up to about 7 or 8 inches or more. While many of the designs are suitable for gripping the tube satisfactorily, it has not been possible to adequately seal the device. On the other hand, where the sealing may be effective, the device is inadequate for gripping the tube to hold it in position under the substantially high pressure delivered by the hydraulic fluid. In addition, many difficulties with present hydraulic chucks are incurred because the piston which is driven by the fluid to cause activation of the gripping means such as radial collets, forces the piston against the tube. In large diameter operations, the force required to cause the collets to adequately grip the tube often times causes damage to the tube or relative movement of the tube with respect to the collets. In any event, the damage to the tube renders the operation substantially more expensive if the tubes can be salvaged. Repair, or the use of substantially lower pressures prevent wide acceptance of hydraulic chucks for larger diameter tubes.

Accordingly, a hydraulic chuck would be highly desireable that could be employed with large diameter tubes of at least 2 to 8 inches in diameter or larger. The device must be capable of gripping the tube firmly to prevent relative movement thereof during application of hydraulic pressure, while simultaneously be capable of gripping the tube without damaging the tube.

SUMMARY OF THE INVENTION

The present invention relates to a hydraulic chuck, comprising a plurality of parts in interworking relationship which accomplish the objects of the present invention. Specifically, the invention includes a hydraulic chuck device which has a piston means having a central axis and an annular extension along the axis and has an inner diameter sized to receive a tube. A seal cone means is positioned adjacent to this extension of the piston means to cooperatively define a seal cavity adjacent the tube. Seal means are located in the seal cavity to prevent passage of fluid between the piston and the tube.

Ring collet means are attached to the cone means and are positioned to engage the tube upon compression of the ring collets. Ring collets are generally ring shaped devices having a flat portion which engages the outer surface of a tube such that the inner surface is forced against the tube upon axial compression of the ring collet.

Body means are slideably mounted on the piston means to permit movement of the piston with respect to the body along the axis. The body means has means for restraining axial movement of the tube in one axial direction. Nose cone means are fixedly mounted on the body and are also attached to the collet means such that movement of the body with respect to the piston operates the ring collet means. Finally, power means for moving the piston with respect to the body to activate the seal means and the ring collet means are provided.

In a preferred embodiment, the ring collet means includes a ring having a first surface parallel to the axis and positioned to engage the tube. A second surface is provided and is inclined from the first surface and is cooperatively sized to engage a similar surface on the seal cone means. Axial movement of the seal cone means toward the ring collet means transmits force through the ring collet to force the collet ring against the tube. Similarly, it is preferred that the ring collet means have a third surface inclined from the first surface and cooperatively sized to engage a similar surface in the nose cone means, whereby axial movement of the piston toward the ring collet means with respect to the body forces the ring collet against the tube.

In another embodiment, the device includes a tube seat means fixedly mounted on the body and slideably mounted on the piston, said tube seat means being positioned to contact the end of the tube to prevent axial movement of the tube in one axial direction. This tube seat means, in a preferred embodiment, includes a plurality of dowel means mounted in the body and slideably passing through the piston to contact the tube, whereby the piston is moveable independent from movement of the tube.

Preferred embodiments, seal means are provided between the body and the piston to permit relative movement of the piston with respect to the body without passage of fluid therebetween. The power means which causes movement of the piston with respect to the body may, in a preferred embodiment, include a pneumatic piston and cylinder between the piston means and the body means to cause the relative movement therebetween.

DESCRIPTION OF THE DRAWINGS

For a more complete understanding of the invention, reference is hereby made to the drawing, in which:

the FIGURE is a partially sectioned view showing one embodiment of the present invention holding a tube.

DETAILED DESCRIPTION OF THE INVENTION

As shown in the FIGURE, the chuck 10 is generally described. The chuck includes a piston 12 having a central axis 13 and a central passage. Annular extension 16 extends along the axis 13 of the piston 12. Tube 17 is positioned inside the diameter of the annular extension 16. Associated with the annular extension 16 of the piston 12 is a seal cone 18 which is connected to the extension 16 via retractor 20. The seal cone 18 and annular extension 16 define a seal cavity 22 in which an o-ring seal 23 is provided. Movement of the piston 12 in the direction of the seal cone 18 causes compression of the o-ring 23 and an effective seal between the tube 17 and the piston extension 16.

The body 24 is mounted to the nose cone 25 via threads 26. Collet ring 27 is mounted on the nose cone 25 and the seal cone 18. Movement of the seal cone 18 toward the nose cone 25 causes compression of the collet rings 27, whereby the collet ring 27 grips the tube 17. Since the flat surface 27a of collet ring 27 is sized to generally fit the tube 17, compression of the collet 27 causes the collet surface 27a to grip the tube 17 without damaging the tube itself.

Second surface 27b is inclined with respect to surface 27a of the ring collet 27 and is cooperatively matched with the seal cone 18 such that movement of the seal cone 18 toward the ring collet 27 forces the collet ring 27 against the tube 17. Similarly, third surface 27c is inclined with respect to surface 27a of the ring 27 such that movement of the piston 12 through extension 16 and ring cone 18 forces the collet ring 27 against the tube 17.

O-ring 28 and back-up ring 29 are provided to prevent passage of fluid between the piston 12 and the body 24. Similarly, o-ring 30 and back-up ring 31 are provided for the same purpose.

A plurality of dowels 32, are mounted in the body 24 and positioned to form a tube engaging seat 33. This tube seat 33 of the dowel 32 is positioned to contact the end of the tube 17 to prevent movement of the tube in one axial direction. The dowel 32 is also slideably mounted in the piston 12 so that the piston 12 may move with respect to the dowel 32. This permits movement of the piston 12 and the annular extension 16 without movement of the tube 17. Preferably, at least 3 dowels 32 are provided equally spaced about the circumferance of the cavity which the tube 17 enters.

To provide a power means for activating the movement of the piston 12 with respect to the body 24 and the tube 17, an air cap 34 is fitted with connection to a pneumatic air supply, not shown, so that piston 35 can be driven by the air. O-rings 36 prevent escape of the fluid and forces the air piston 35 and the piston 12 to move with respect to the body 24. Bolts 37 fixedly mount the air cap 34 to the body 24. Test connect 39 allows hydraulic fluid to enter the system through the body 24 and the piston 12. Additional holes can be placed in the piston 12 equidistant from the holes which dowels 32 pass through.

In operation, the tube 17 is inserted into the device against dowel 32. Operation of the air piston 35 to the air cap 34 causes movement of the piston 12 with respect to the body 24. Movement of the piston 12 causes the annular extension 16 to engage the seal cone 18 and close the seal cavity 22 causing seal 23 to be urged against the tube 17. Collet ring 27 is compressed by force of the seal cone against surface 27b and the nose cone against surface 27c so that flat surface 27a is urged against the tube 17. Seal and back-up ring combinations 28 and 29 and 30 and 31 prevent passage of fluid between the piston 12 and the body 24. The tube is gripped firmly in the collet ring 27 so that fluid may be passed through the test connect 39 to the various operations by which hydrostatic testing and expanding can be performed. As it can be seen, the collet ring 27 is suitable for gripping large diameter tubes in a manner heretofore not disclosed.

When the testing or expanding operation is completed, pressure is removed from test connect 39 and air pressure is removed from the air cap 34. Air pressure is then applied to the "open" port 40, and forces air piston 35 and bolt 42 to the right, pulling piston 12, annular extension 16, retractor 20 and seal cone 18 away from the ring collet 27. At the same time, pressure entering port 40 causes body 24 to move nose cone 27 away from ring collet 27. Annular extension of nose cone 25 (25a) and of seal cone 18 (18a) are spaced such that both conical sections of 27 (27b & 27c) are positively released from the mating surfaces of nose cone 25 and seal cone 18.

Having thus described the invention, what is claimed is:

1. A hydraulic chuck device, comprising:
    a piston having a central axis and an annular extention along said axis with an inner diameter sized to receive a tube;
    seal cone means positioned adjacent said extension to cooperatively define a seal cavity adjacent said tube;
    seal means located in said cavity to prevent passage of fluid between said piston and said tube;
    ring collet means attached to said seal cone means and positioned to engage said tube upon compression of said ring collet means;
    body means slideably mounting said piston to permit movement of said piston with respect to said body means along said axis, said body means having tube seat means for restraining axial movement of said tube in one axial direction;
    nose cone means fixedly mounted on said body means and attached to said ring collet means such that movement of said body means with respect to said piston operates said ring collet means;
    power means for moving said piston with respect to said body means to activate said seal means and said ring collet means; and
    said tube seat means fixedly mounted on said body means and slideably mounted through said piston, said tube seat means being positioned to contact the end of said tube to prevent axial movement of said tube in one axial direction.

2. The device of claim 1, wherein said ring collet means includes a ring having a first surface parallel to said axis and positioned to engage said tube, and a second surface inclined from said first surface and cooperatively sized to engage said seal cone means, whereby axial movement of said seal cone means toward said collet ring forces said collet ring against said tube.

3. The device of claim 2, wherein said ring collet means includes a third surface inclined from said first surface and cooperatively sized to engage said nose cone means, whereby axial movement of said piston toward said collet ring with respect to said body forces said collet ring against said tube.

4. The device of claim 1, wherein said tube seat means includes a plurality of dowel means mounted to said body means and slideably passing through said piston to contact said tube, whereby said piston is moveable, independent from movement of said tube.

5. The device of claim 1 which further includes seal means between said body means and said piston to permit relative movement without passage of fluid therebetween.

6. The device of claim 1, wherein said power means include a pneumatic piston and cylinder between said piston and said body means to cause selective movement therebetween.

7. The device of claim 1, which includes annular extensions to said nose cone means and said seal cone means which can engage mating surfaces on said ring collet means and effect a positive release of the collet gripping forces when actuated by a circumferential retractor ring.

* * * * *